(12) United States Patent
Matsuhashi et al.

(10) Patent No.: US 9,278,547 B2
(45) Date of Patent: Mar. 8, 2016

(54) RECORD AND METHOD FOR MANUFACTURING RECORD

(71) Applicant: SEIKO EPSON CORPORATION, Tokyo (JP)

(72) Inventors: Kunihiko Matsuhashi, Matsumoto (JP); Hitoshi Ohta, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/191,154

(22) Filed: Feb. 26, 2014

(65) Prior Publication Data

US 2014/0240419 A1    Aug. 28, 2014

(30) Foreign Application Priority Data

Feb. 27, 2013    (JP) .................................. 2013-036778

(51) Int. Cl.
| | |
|---|---|
| B41J 2/01 | (2006.01) |
| B41J 11/00 | (2006.01) |
| B41M 5/00 | (2006.01) |
| B41M 7/00 | (2006.01) |
| C09D 11/102 | (2014.01) |
| C09D 11/106 | (2014.01) |
| C09D 11/322 | (2014.01) |
| B41J 29/38 | (2006.01) |

(52) U.S. Cl.
CPC .......... *B41J 11/0015* (2013.01); *B41M 5/0023* (2013.01); *B41M 7/009* (2013.01); *C09D 11/102* (2013.01); *C09D 11/106* (2013.01); *C09D 11/322* (2013.01)

(58) Field of Classification Search
CPC .... B41J 2/2114; B41J 11/0015; B41J 11/002; B41M 7/00; B41M 7/0027; B41M 7/0036; B41M 7/0054; B41M 7/0072; B41M 7/009
USPC ........................................... 347/16, 101, 102
See application file for complete search history.

(56) References Cited

U.S. PATENT DOCUMENTS

| | | | | |
|---|---|---|---|---|
| 3,078,589 | A * | 2/1963 | Carlson .............................. 34/77 |
| 3,149,931 | A * | 9/1964 | Gundlach ....................... 34/630 |
| 4,439,144 | A * | 3/1984 | Mair .............................. 432/59 |
| 5,140,377 | A * | 8/1992 | Lewis et al. ................... 399/335 |
| 5,666,628 | A * | 9/1997 | Fukai ............................ 399/340 |
| 6,067,437 | A * | 5/2000 | Schonfeld .................... 399/320 |
| 6,309,463 | B1 * | 10/2001 | Hess et al. .................... 118/302 |
| 7,006,783 | B2 * | 2/2006 | Keidel et al. ................. 399/340 |
| 7,883,204 | B2 * | 2/2011 | Shinkawa et al. ............. 347/104 |
| 8,042,906 | B2 * | 10/2011 | Chiwata et al. ................ 347/21 |
| 8,123,345 | B2 * | 2/2012 | Kovacs et al. ................ 347/100 |
| 8,606,165 | B2 * | 12/2013 | Kovacs et al. ................ 399/335 |
| 2005/0074601 | A1 | 4/2005 | Onishi |
| 2009/0233061 | A1 | 9/2009 | Irita |
| 2009/0244146 | A1 | 10/2009 | Chiwata |
| 2010/0208021 | A1 | 8/2010 | Hori |
| 2010/0295909 | A1 * | 11/2010 | Doi et al. ........................ 347/86 |
| 2011/0227990 | A1 * | 9/2011 | Kuwabara et al. .............. 347/20 |
| 2012/0194621 | A1 | 8/2012 | Ikegami |

FOREIGN PATENT DOCUMENTS

| | | | |
|---|---|---|---|
| JP | 10151733 A * | 6/1998 | ................ B41J 2/01 |
| JP | 2000-351922 | 12/2000 | |
| JP | 2005178252 A * | 7/2005 | ................ B41J 2/01 |
| JP | 2009-226886 | 10/2009 | |
| JP | 2009-285878 | 12/2009 | |
| JP | 2010-184479 | 8/2010 | |
| JP | 2010-184480 | 8/2010 | |

OTHER PUBLICATIONS

European Search Report for European Patent Application No. 14156646.3 dated May 15, 2014.

* cited by examiner

*Primary Examiner* — Jannelle M Lebron
*Assistant Examiner* — Jeremy Bishop
(74) *Attorney, Agent, or Firm* — Workman Nydegger

(57) ABSTRACT

A method for manufacturing a record includes an image layer-forming step of forming an image layer by applying ink containing resin and a solvent A to a recording medium, a heating step of heating the image layer to a temperature not lower than the glass transition temperature of the resin, and a solvent-removing step of removing the solvent A from the image layer after the heating step.

16 Claims, No Drawings

RECORD AND METHOD FOR MANUFACTURING RECORD

BACKGROUND

1. Technical Field

The present invention relates to a record and a method for manufacturing such a record.

2. Related Art

Hitherto, records have been manufactured in such a way that ink containing resin and a solvent is applied to a recording medium such as a film and an image layer is thereby formed on the recording medium (refer to, for example, JP-A-2009-226886).

In a conventional method, after ink is applied to a recording medium, an image layer is heated at the minimum film-forming temperature of the ink and a solvent is thereby removed.

However, in a record manufactured by this method, an image is fixed in such a state that an internal stress is applied to the image layer. Therefore, there is a problem in that cracks are caused in the image layer by the internal stress to reduce the adhesion of the image layer to a recording medium.

SUMMARY

An advantage of some aspects of the invention is to provide a record including an image layer having a reduced internal stress and excellent adhesion properties and a method for manufacturing such a record.

Such an advantage is achieved by the invention as described below. A method for manufacturing a record according to an aspect of the invention includes an image layer-forming step of forming an image layer by applying ink containing resin and a solvent A to a recording medium, a heating step of heating the image layer to a temperature not lower than the glass transition temperature of the resin, and a solvent-removing step of removing the solvent A from the image layer after the heating step. This allows a record in which the internal stress in an image layer is reduced and the image layer has excellent adhesion properties to be readily manufactured.

In the method, gas is preferably applied to the image layer in the solvent-removing step. This allows the solvent A to be efficiently removed from the image layer.

In the method, the temperature of the gas preferably ranges from 60° C. to the temperature of the heating step. This allows the solvent A to be more efficiently removed from the image layer.

In the method, the glass transition temperature of the resin is preferably −30° C. to 150° C. This allows the image layer to have high adhesion to the recording medium and also allows the internal stress in the image layer to be effectively reduced.

In the method, the heating temperature in the heating step is preferably 50° C. to 150° C. This allows the resin in the image layer to reliably form a film to allow the adhesion of the image layer to the recording medium to be efficiently enhanced.

The method preferably further includes a protective layer-forming step of forming a protective layer on the side of the image layer opposite to the recording medium. This allows an obtained record to have more excellent heat resistance and abrasion resistance.

In the method, the protective layer is preferably formed using a protective layer-forming ink containing a solvent B with a boiling point of 180° C. or higher. This prevents the solvent B from being removed from the protective layer in the heating step and the solvent-removing step to prevent the protective layer from being filmed; hence, the evaporation of the solvent A from the image layer can be prevented from being inhibited. As a result, the internal stress in the image layer can be more reliably reduced.

A record according to the invention is manufactured by the method. This allows the record to include an image layer having a reduced internal stress and excellent adhesion properties.

DESCRIPTION OF EXEMPLARY EMBODIMENTS

Embodiments of the invention will now be described in detail.

Method for Manufacturing Record

A method for manufacturing a record according to a preferred embodiment of the invention is described below. The method is one for manufacturing the record in such a way that ink containing resin and a solvent A is applied to a recording medium.

The method according to this embodiment includes a recording medium-preparing step of preparing the recording medium, an image layer-forming step of forming an image layer by applying the ink containing the resin and the solvent A to the recording medium, a protective layer-forming step of forming a protective layer on the side of the image layer opposite to the recording medium, a heating step of heating the image layer to a temperature not lower than the glass transition temperature of the resin contained in the ink, and a solvent-removing step of removing the solvent A from the image layer after the heating step.

By the way, in a conventional method for manufacturing a record, after ink is applied to a recording medium, an image layer is heated at the minimum film-forming temperature of the ink and a solvent is thereby removed.

In a record manufactured by the conventional method, an image is fixed in such a state that an internal stress is applied to the image layer. Therefore, there is a problem in that cracks are caused in the image layer by the internal stress to reduce the adhesion of the image layer to a recording medium.

However, the method according to this embodiment has a feature that after the image layer is heated to a temperature not lower than the glass transition temperature of the resin contained in the ink, the solvent is removed from the image layer.

This feature allows the internal stress in the image layer to be reduced and also allows cracks or the like to be prevented from being caused in the image layer. As a result, the manufactured record includes an image with excellent adhesion properties and exhibits extremely high fastness. This is probably due to reasons below.

It is conceivable that the internal stress in the image layer is reduced and adhesion properties of the image layer are enhanced because the image layer is heated to a temperature not lower than the glass transition temperature of the resin in such a state that the image layer contains the solvent A (the image layer has fluidity), the resin is therefore kept soft, and the solvent A is removed in such a state. In contrast, in the case of performing the softening of resin and the removal of a solvent at once, this solvent is removed from an image layer in such a state that this resin is relatively hard and the fluidity of this resin is low; hence, this image layer is solidified with an internal stress remaining therein. As a result, cracks are caused in this image layer to reduce the adhesion of this image layer to a recording medium.

Steps of the method according to this embodiment are described below in detail.

Recording Medium-Preparing Step

In the recording medium-preparing step, the recording medium is prepared. The recording medium may be an ink-absorbent recording medium, an ink-nonabsorbent recording medium, or a low ink-absorbing recording medium.

Examples of the ink-absorbent recording medium include sheets of ink jet paper including plain paper, high-quality paper, and glossy paper.

Examples of the low ink-absorbing recording medium include sheets of printing paper including art paper, coated paper, and matte paper.

Examples of the ink-nonabsorbent recording medium include plastic films; sheets of a base material, such as paper, coated with plastic; and plastic film-attached sheets. Examples of the plastic include, but are not limited to, polyvinyl chloride, polyethylene terephthalate, polycarbonate, polystyrene, polyurethane, polyethylene, and polypropylene.

The recording medium may include a base layer for enhancing the adhesion of the image layer. The base layer can be formed by applying, for example, ink containing resin and a solvent to the recording medium. In the case of forming the base layer using this ink, the image layer may contain a colorant for the purpose of enhancing the visibility of the image layer.

Image Layer-Forming Step

In the image layer-forming step, the image layer is formed by applying the ink containing the resin and the solvent A to the recording medium. A process for applying the ink to the recording medium is not particularly limited and is preferably an ink jet process. The ink jet process requires no printing plate and enables on-demand printing. As a result, high-mix low-volume manufacturing can be coped with.

Ink

Components of the ink are described below.

Resin

The ink contains the resin. Since the ink contains the resin, the image layer has enhanced adhesion to the recording medium and the record can exhibit excellent fastness (abrasion resistance).

The resin is not particularly limited and is preferably a thermoplastic resin. This allows the obtained record to have more excellent abrasion resistance.

The resin preferably has a glass transition temperature of −30° C. to 150° C. and more preferably 50° C. to 150° C. This allows the image layer to have higher adhesion to the recording medium. In addition, the internal stress in the image layer can be effectively reduced.

Examples of the resin include homopolymers and copolymers of (meth)acrylic acid, (meth)acrylic esters, acrylonitrile, cyanoacrylates, acrylamide, olefins, styrene, vinyl acetate, vinyl chloride, vinyl alcohol, vinyl ether, vinylpyrrolidone, vinyl pyridine, vinylcarbazole, vinylimidazole, and vinylidene chloride and also include fluororesins and natural resins. In particular, a styrene-acrylic acid copolymer is preferably used. The above copolymers may be random copolymers, block copolymers, alternating copolymers, or graft copolymers.

As used herein, the term "(meth)acrylic" refers collectively to "acrylic" and "methacrylic".

The resin may be a known material, a product obtained by a known process, or a commercially available product. Examples of the commercially available product include, but are not limited to, commercial products, such as Microgel E-1002 and Microgel E-5002, available from Nippon Paint Co., Ltd.; commercial products, such as Boncoat 4001 and Boncoat 5454, available from DIC Corporation; a commercial product, such as SAE-1014, available from Zeon Corporation; a commercial product, such as Saivinol SK-200, available from Saiden Chemical Industry Co., Ltd.; and commercial products, such as Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610, available from BASF Japan Ltd.

Solvent A

The ink contains the solvent A. The solvent A has a function for stabilizing the resin in the ink. In addition, the solvent A functions as a humectant for the ink.

Examples of the solvent A include polyols and glycol ethers. Examples of the polyols include glycerin, ethylene glycol, diethylene glycol, triethylene glycol, propylene glycol, dipropylene glycol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 2-methyl-2,4-pentanediol, 3-methyl-1,5-pentanediol, 1,2-hexanediol, and 1,6-hexanediol. Examples of the glycol ethers include monoalkyl ethers of at least one selected from the group consisting of ethylene glycol, diethylene glycol, triethylene glycol, propylene glycol, dipropylene glycol, and tripropylene glycol.

The ink may contain one or more solvents in addition to the solvent A.

Colorant

The ink may contain a colorant. Examples of the colorant include pigments and dyes.

Pigments

The pigments are insoluble or sparingly soluble in water and are unlikely to be discolored by light, gas, or the like. Therefore, when the ink contains a pigment, a record recorded using the ink has good water resistance, gas resistance, light resistance, and storage stability.

The pigments may be inorganic and organic pigments.

Examples of the inorganic pigments include, but are not limited to, carbon black, iron oxide, and titanium oxide. In particular, carbon black is preferably used because carbon black has good color developability and is unlikely to settle during dispersion because of its low density.

Examples of the carbon black used herein include furnace black; lamp black; acetylene black; channel black such as C. I. Pigment Black 7; commercial products, such as Carbon Black No. 2300, Carbon Black No. 900, Carbon Black MCF 88, Carbon Black No. 20B, Carbon Black No. 33, Carbon Black No. 40, Carbon Black No. 45, Carbon Black No. 52, Carbon Black MA 7, Carbon Black MA 8, Carbon Black MA 100, and Carbon Black No. 2200B, available from Mitsubishi Chemical Corporation; commercial products, such as Color Black FW 1, Color Black FW 2, Color Black FW 2V, Color Black FW 18, Color Black FW 200, Color Black S 150, Color Black S 160, Color Black S 170, Printex 35, Printex U, Printex V, Printex 140U, Special Black 6, Special Black 5, Special Black 4A, Special Black 4, and Special Black 250, available from Degussa AG; commercial products, such as Conductex SC, Raven 1255, Raven 5750, Raven 5250, Raven 5000, Raven 3500, Raven 1255, and Raven 700, available from Columbian Carbon Japan, Ltd.; and commercial products, such as Regal 400R, Regal 330R, Regal 660R, Mogul L, Monarch 700, Monarch 800, Monarch 880, Monarch 900, Monarch 1000, Monarch 1100, Monarch 1300, Monarch 1400, and Elftex 12, available from Cabot Corporation.

Examples of the organic pigments include quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

The organic pigments are preferably used because the organic pigments have good color developability and are unlikely to settle during dispersion because of their low density.

Particular examples of the organic pigments are as described below.

Examples of an organic pigment for use in a cyan ink include C. I. Pigment Blue 1, C. I. Pigment Blue 2, C. I. Pigment Blue 3, C. I. Pigment Blue 15, C. I. Pigment Blue 15:1, C. I. Pigment Blue 15:2, C. I. Pigment Blue 15:3, C. I. Pigment Blue 15:4, C. I. Pigment Blue 15:6, C. I. Pigment Blue 15:34, C. I. Pigment Blue 16, C. I. Pigment Blue 18, C. I. Pigment Blue 22, C. I. Pigment Blue 60, C. I. Pigment Blue 65, C. I. Pigment Blue 66, C. I. Vat Blue 4, and C. I. Vat Blue 60.

Examples of an organic pigment for use in a magenta ink include C. I. Pigment Red 1, C. I. Pigment Red 2, C. I. Pigment Red 3, C. I. Pigment Red 4, C. I. Pigment Red 5, C. I. Pigment Red 6, C. I. Pigment Red 7, C. I. Pigment Red 8, C. I. Pigment Red 9, C. I. Pigment Red 10, C. I. Pigment Red 11, C. I. Pigment Red 12, C. I. Pigment Red 14, C. I. Pigment Red 15, C. I. Pigment Red 16, C. I. Pigment Red 17, C. I. Pigment Red 18, C. I. Pigment Red 19, C. I. Pigment Red 21, C. I. Pigment Red 22, C. I. Pigment Red 23, C. I. Pigment Red 30, C. I. Pigment Red 31, C. I. Pigment Red 32, C. I. Pigment Red 37, C. I. Pigment Red 38, C. I. Pigment Red 40, C. I. Pigment Red 41, C. I. Pigment Red 42, C. I. Pigment Red 48 (Ca), C. I. Pigment Red 48 (Mn), C. I. Pigment Red 57 (Ca), C. I. Pigment Red 57:1, C. I. Pigment Red 88, C. I. Pigment Red 112, C. I. Pigment Red 114, C. I. Pigment Red 122, C. I. Pigment Red 123, C. I. Pigment Red 144, C. I. Pigment Red 146, C. I. Pigment Red 149, C. I. Pigment Red 150, C. I. Pigment Red 166, C. I. Pigment Red 168, C. I. Pigment Red 170, C. I. Pigment Red 171, C. I. Pigment Red 175, C. I. Pigment Red 176, C. I. Pigment Red 177, C. I. Pigment Red 178, C. I. Pigment Red 179, C. I. Pigment Red 184, C. I. Pigment Red 185, C. I. Pigment Red 187, C. I. Pigment Red 202, C. I. Pigment Red 209, C. I. Pigment Red 219, C. I. Pigment Red 224, C. I. Pigment Red 245, C. I. Pigment Red 254, C. I. Pigment Red 264, C. I. Pigment Violet 19, C. I. Pigment Violet 23, C. I. Pigment Violet 32, C. I. Pigment Violet 33, C. I. Pigment Violet 36, C. I. Pigment Violet 38, C. I. Pigment Violet 43, and C. I. Pigment Violet 50.

Examples of an organic pigment for use in a yellow ink include C. I. Pigment Yellow 1, C. I. Pigment Yellow 2, C. I. Pigment Yellow 3, C. I. Pigment Yellow 4, C. I. Pigment Yellow 5, C. I. Pigment Yellow 6, C. I. Pigment Yellow 7, C. I. Pigment Yellow 10, C. I. Pigment Yellow 11, C. I. Pigment Yellow 12, C. I. Pigment Yellow 13, C. I. Pigment Yellow 14, C. I. Pigment Yellow 16, C. I. Pigment Yellow 17, C. I. Pigment Yellow 24, C. I. Pigment Yellow 34, C. I. Pigment Yellow 35, C. I. Pigment Yellow 37, C. I. Pigment Yellow 53, C. I. Pigment Yellow 55, C. I. Pigment Yellow 65, C. I. Pigment Yellow 73, C. I. Pigment Yellow 74, C. I. Pigment Yellow 75, C. I. Pigment Yellow 81, C. I. Pigment Yellow 83, C. I. Pigment Yellow 93, C. I. Pigment Yellow 94, C. I. Pigment Yellow 95, C. I. Pigment Yellow 97, C. I. Pigment Yellow 98, C. I. Pigment Yellow 99, C. I. Pigment Yellow 108, C. I. Pigment Yellow 109, C. I. Pigment Yellow 110, C. I. Pigment Yellow 113, C. I. Pigment Yellow 114, C. I. Pigment Yellow 117, C. I. Pigment Yellow 120, C. I. Pigment Yellow 124, C. I. Pigment Yellow 128, C. I. Pigment Yellow 129, C. I. Pigment Yellow 133, C. I. Pigment Yellow 138, C. I. Pigment Yellow 139, C. I. Pigment Yellow 147, C. I. Pigment Yellow 151, C. I. Pigment Yellow 153, C. I. Pigment Yellow 154, C. I. Pigment Yellow 155, C. I. Pigment Yellow 167, C. I. Pigment Yellow 172, C. I. Pigment Yellow 180, C. I. Pigment Yellow 185, and C. I. Pigment Yellow 213.

Examples of a pigment for use in a color ink, such as a green or orange ink, other than the above inks are those conventionally known.

The pigments may be used alone or in combination.

Dyes

Examples of the dyes include acidic dyes, direct dyes, reactive dyes, and basic dyes. Particular examples of the dyes include C. I. Acid Yellow 17, C. I. Acid Yellow 23, C. I. Acid Yellow 42, C. I. Acid Yellow 44, C. I. Acid Yellow 79, C. I. Acid Yellow 142, C. I. Acid Red 52, C. I. Acid Red 80, C. I. Acid Red 82, C. I. Acid Red 249, C. I. Acid Red 254, C. I. Acid Red 289, C. I. Acid Blue 9, C. I. Acid Blue 45, C. I. Acid Blue 249, C. I. Acid Black 1, C. I. Acid Black 2, C. I. Acid Black 24, C. I. Acid Black 94, C. I. Food Black 1, C. I. Food Black 2, C. I. Direct Yellow 1, C. I. Direct Yellow 12, C. I. Direct Yellow 24, C. I. Direct Yellow 33, C. I. Direct Yellow 50, C. I. Direct Yellow 55, C. I. Direct Yellow 58, C. I. Direct Yellow 86, C. I. Direct Yellow 132, C. I. Direct Yellow 142, C. I. Direct Yellow 144, C. I. Direct Yellow 173, C. I. Direct Red 1, C. I. Direct Red 4, C. I. Direct Red 9, C. I. Direct Red 80, C. I. Direct Red 81, C. I. Direct Red 225, C. I. Direct Red 227, C. I. Direct Blue 1, C. I. Direct Blue 2, C. I. Direct Blue 15, C. I. Direct Blue 71, C. I. Direct Blue 86, C. I. Direct Blue 87, C. I. Direct Blue 98, C. I. Direct Blue 165, C. I. Direct Blue 199, C. I. Direct Blue 202, C. I. Direct Black 19, C. I. Direct Black 38, C. I. Direct Black 51, C. I. Direct Black 71, C. I. Direct Black 154, C. I. Direct Black 168, C. I. Direct Black 171, C. I. Direct Black 195, C. I. Reactive Red 14, C. I. Reactive Red 32, C. I. Reactive Red 55, C. I. Reactive Red 79, C. I. Reactive Red 249, C. I. Reactive Black 3, C. I. Reactive Black 4, and C. I. Reactive Black 35.

The dyes may be used alone or in combination.

Water

The ink may contain water from the viewpoint of safety, handling, and performance (color developability, strike-through proofness, and ink reliability).

The water used herein is preferably pure water such as ion-exchanged water, ultrafiltered water, reverse osmosis-purified water, or distilled water or ultrapure water. In particular, water sterilized by ultraviolet irradiation or hydrogen peroxide addition is preferably used because the proliferation of molds and bacteria can be prevented and therefore the long-term storage of the ink is enabled.

Surfactant

The ink may contain a sufficient. The surfactant is not particularly limited and is preferably a nonionic surfactant. The nonionic surfactant has the ability to uniformly spread the ink on the recording medium. Therefore, in the case of performing ink jet recording using ink containing the nonionic surfactant, a high-density image with substantially no bleed is obtained.

Examples of the nonionic surfactant include, but are not limited to, acetylene glycol surfactants, silicone surfactants, polyoxyethylene alkylallyl ethers, polyoxypropylene alkylallyl ethers, polyphenyl ethers, sorbitan derivatives, and fluorine surfactants.

These surfactants may be used alone or in combination.

Other Components

The ink may further contain an organic solvent, a pH adjustor, an antiseptic/fungicidal agent, a rust preventive, a chelating agent, and the like in addition to the above components.

Protective Layer-Forming Step

In the protective layer-forming step, the protective layer is formed on the outside of the image layer. The formation of the protective layer allows the obtained record to have more excellent heat resistance and abrasion resistance.

A process for forming the protective layer is not particularly limited. The protective layer is preferably formed using a protective layer-forming ink.

The protective layer-forming ink may contain, for example, resin, a solvent B, and the like.

The resin contained in the protective layer-forming ink may be at least one of the resins described above for the ink.

The resin contained in the protective layer-forming ink preferably has a glass transition temperature higher than that of the resin contained in the ink used to form the image layer. This allows the obtained record to have more excellent heat resistance and abrasion resistance.

The solvent B may be at least one of the solvents described above for the ink.

The solvent B preferably has a boiling point of 180° C. or higher and more preferably 220° C. or higher. The boiling point of the solvent B, which is contained in the protective layer-forming ink, is preferably higher than the boiling point of the solvent A, which is contained in the ink used to form the image layer. This allows the evaporation of the solvent B from the protective layer to be slower than the evaporation of the solvent A from the image layer. Therefore, the protective layer is prevented from being filmed prior to the image layer by the removal of the solvent B from the protective layer; hence, the filming of the protective layer can be prevented from inhibiting the evaporation of the solvent A from the image layer. As a result, the internal stress in the image layer can be reliably reduced. That is, in the case of forming several stacked layers, the boiling point of a solvent contained in ink used to form an upper layer is preferably higher than the boiling point of a solvent contained in ink used to form a lower layer. This prevents the upper layer from being filmed prior to the lower layer to avoid that the solvent contained in the ink used to form the lower layer is unlikely to be evaporated. The boiling point of the solvent contained in the ink used to form the lower layer may be equal to the boiling point of the solvent contained in the ink used to form the upper layer unless the evaporation of the solvent contained in the ink used to form the lower layer is inhibited.

Heating Step

In the heating step, the image layer formed in the image layer-forming step is heated to a temperature not lower than the glass transition temperature of the resin in the ink. This allows the resin contained in the image layer to form a resin and therefore the image layer adheres tightly to the recording medium.

In the heating step, the image layer is heated to a temperature not lower than the glass transition temperature of the resin in the ink. In particular, the heating temperature in the heating step is preferably 50° C. to 150° C. and more preferably 75° C. to 90° C. This allows the resin in the image layer to reliably form a film to allow the adhesion of the image layer to the recording medium to be efficiently enhanced.

The heating rate in the heating step is preferably 30° C./s or more and more preferably 40° C./s to 50° C./s. This allows the resin in the ink to be heated to a temperature not lower than the glass transition temperature thereof in a short time; hence, the evaporation of the solvent A from the inside of the image layer is suppressed and the resin in the image layer can be made soft. As a result, the internal stress in the image layer can be reliably reduced.

In the heating step, any heater may be used and the image layer is preferably heated with infrared light. This allows energy to be applied to the ink on the recording medium to heat the ink without increasing the temperature of the recording medium; hence, the heating rate of the image layer can be appropriately adjusted.

The heating time is preferably 2 seconds to 5 seconds after the heating temperature is attained. This allows the evaporation of the solvent A from the image layer to be suppressed and also allows the resin in the image layer to be reliably made soft. As a result, the internal stress in the image layer can be reliably reduced.

The heating step has an object to make the resin soft and therefore most of the solvent A remains in the image layer in the heating step.

The content of the solvent A in the image layer at the end of the heating step preferably has a score of 10 or more and more preferably 10 to 40, where a score of 100 represents the content of the solvent A in the image layer untreated in the heating step. This allows the resin to be made soft in such a state that the fluidity of the resin is ensured with the solvent A remaining in the image layer. Therefore, the internal stress in the image layer can be effectively reduced and the adhesion of the image layer can be enhanced.

During the heating step, a space around the recording medium may be filled with the vapor of the solvent A. This allows the evaporation of the solvent A from the inside of the image layer to be suppressed.

Solvent-Removing Step

The solvent-removing step is subsequent to the heating step (heat treatment).

The solvent-removing step has an object to remove the solvent A from the image layer. A way to remove the solvent A is not particularly limited. A way to apply gas to the image layer is preferably used. The use of this way allows the solvent A to be efficiently removed from the image layer.

The temperature of the gas applied to the image layer is preferably 60° C. or higher, and more preferably 85° C. or higher. This allows the solvent A to be efficiently removed from the image layer.

The velocity (air velocity) of the gas applied to the image layer is preferably 5 m/s or more. This allows the solvent A to be efficiently removed from the image layer.

In order to remove the solvent A, the space around the recording medium may be decompressed. In the case of decompressing the space around the recording medium, the recording medium is preferably heated during decompression. This allows the solvent A to be removed in a short time.

Record

A record according to an embodiment of the invention is one manufactured by the above-mentioned method. Thus, the record includes an image with excellent adhesion properties and exhibits extremely high fastness.

While the invention has been described with reference to preferred embodiments, the invention is not limited to the embodiments. For example, a manufacturing method according to an embodiment of the invention may include another step in addition to the above-mentioned steps.

EXAMPLES

The invention is further described below in detail with reference to examples. The invention is not limited to the examples.

(1) Preparation of Base Layer-Forming Inks

Materials shown in Table 1 were mixed in accordance with common practice, whereby base layer-forming inks S1 to S5 were prepared.

In Table 1, the boiling point and glass transition temperature of each material are represented by bp and Tg, respectively.

(4) Manufacture of Records

Example 1

A base layer was formed on a plastic film, FOR-BT™, available from Futamura Chemical Co., Ltd. in such a way that the base layer-forming ink S1 was applied to the plastic film with a duty of 100% using an ink jet printer,

TABLE 1

| | Solvents (Polyols) | | | Resins | | | | | |
|---|---|---|---|---|---|---|---|---|---|
| | bp: 223° C. (mass percent) | bp: 189° C. (mass percent) | bp: 232° C. (mass percent) | Urethane resin Tg: 25° C. (mass percent) | Styrene-acrylic resin Tg: 80° C. (mass percent) | Styrene-acrylic resin Tg: 80° C. or higher (mass percent) | White pigment (mass percent) | Silicone surfactant (mass percent) | Water (mass percent) |
| S1 | 3 | 15 | — | 2 | 2 | — | 10 | 1 | Balance |
| S2 | 3 | 15 | — | 3 | 2 | — | 10 | 1 | Balance |
| S3 | 3 | 15 | — | 3 | 1 | — | 10 | 1 | Balance |
| S4 | 3 | 15 | — | 3 | — | 1 | 10 | 1 | Balance |
| S5 | 3 | — | 15 | 4 | — | — | 10 | 1 | Balance |

(2) Preparation of Image Layer-Forming Inks

Materials shown in Table 2 were mixed in accordance with common practice, whereby image layer-forming inks C1 and C2 were prepared.

In Table 2, the boiling point and glass transition temperature of each material are represented by bp and Tg, respectively.

PX-G5300™, available from Seiko Epson Corporation, whereby a recording medium was prepared.

A solid image was printed on the base layer in such a way that the image layer-forming ink C1 was applied to the base layer with a duty of 100% using the ink jet printer, whereby an image layer was formed.

TABLE 2

| | Solvents (Polyols) | | | Resin Styrene-acrylic | Pigment | | Silicone | Water |
|---|---|---|---|---|---|---|---|---|
| | bp: 223° C. (mass percent) | bp: 245° C. (mass percent) | bp: 232° C. (mass percent) | resin Tg: 80° C. or higher (mass percent) | Carbon black (mass percent) | C.I. Pigment Blue 15:3 (mass percent) | surfactant (mass percent) | (mass percent) |
| C1 | 6 | 20 | 5 | 1 | 5 | — | 1 | Balance |
| C2 | 6 | 20 | 5 | 1 | — | 5 | 1 | Balance |

(3) Preparation of Protective Layer-Forming Inks

Materials shown in Table 3 were mixed in accordance with common practice, whereby protective layer-forming inks OP1 and OP2 were prepared.

In Table 3, the boiling point and glass transition temperature of each material are represented by bp and Tg, respectively.

The protective layer-forming ink OP1 was applied to the image layer with a duty of 100% using the ink jet printer, whereby a protective layer was formed.

The recording medium was heated at a rate of 40° C./s and was heated at a temperature of 80° C. for 2 seconds using an infrared heater.

To the recording medium, 90° C. hot air was applied at an air velocity of 15 m/s for 58 seconds in such a state that the

TABLE 3

| | Solvents (Polyols) | | | Resin Styrene-acrylic resin | | |
|---|---|---|---|---|---|---|
| | bp: 223° C. (mass percent) | bp: 189° C. (mass percent) | bp: 232° C. (mass percent) | Tg: 101° C. (mass percent) | Silicone surfactant (mass percent) | Water (mass percent) |
| OP1 | 5 | 20 | — | 8 | 1 | Balance |
| OP2 | 5 | — | 20 | 8 | 1 | Balance | recording medium was heated with the infrared heater, whereby a record was obtained.

Examples 2 to 6

Records were manufactured in substantially the same way as that used in Example 1 except that base layer-forming inks, image layer-forming inks, and protective layer-forming inks shown in Table 4 were used and the heating rate, heating temperature, and heating time in a heating step and the air temperature, air velocity, and air-blowing time in a solvent-removing step were set as shown in Table 4.

Comparative Example

A base layer was formed on a plastic film, FOR-BT™, available from Futamura Chemical Co., Ltd. in such a way that the base layer-forming ink S1 was applied to the plastic film with a duty of 100% using an ink jet printer, PX-G5300™, available from Seiko Epson Corporation, whereby a recording medium was prepared.

A solid image was printed on the base layer in such a way that the image layer-forming ink C1 was applied to the base layer with a duty of 100% using the ink jet printer, whereby an image layer was formed.

The protective layer-forming ink OP1 was applied to the image layer with a duty of 50% using the ink jet printer, whereby a protective layer was formed.

The recording medium was heated at a rate of 40° C./s and 90° C. hot air was applied to the recording medium at an air velocity of 15 m/s for 58 seconds in such a state that the recording medium was heated at a temperature of 80° C. for 2 seconds using an infrared heater, whereby a record was obtained.

The entire disclosure of Japanese Patent Application No. 2013-36778, filed Feb. 27, 2013 is expressly incorporated by reference herein.

What is claimed is:

1. A method for manufacturing a record, comprising:
   an image layer-forming step of forming an image layer by applying ink containing resin and a solvent A to a recording medium;
   a heating step of heating the image layer to a temperature not lower than a glass transition temperature of the resin, wherein a heating rate in the heating step is 30° C./s or more;
   a suppression step of suppressing solvent evaporation from the image layer, wherein the heating step and the suppression step are performed at the same time; and
   a solvent-removing step of removing the solvent A from the image layer after the heating step.

2. The method according to claim 1, wherein gas is applied to the image layer in the solvent-removing step.

3. The method according to claim 2, wherein the temperature of the gas ranges from 60° C. to the temperature of the heating step.

4. The method according to claim 1, wherein the glass transition temperature of the resin is −30° C. to 150° C.

5. The method according to claim 1, wherein the heating temperature in the heating step is 50° C. to 150° C.

6. The method according to claim 1, further comprising a protective layer-forming step of forming a protective layer on the side of the image layer opposite to the recording medium.

7. The method according to claim 6, wherein the protective layer is formed using a protective layer-forming ink containing a solvent B with a boiling point of 180° C. or higher.

TABLE 4

| | Type of base layer-forming ink | Type of image layer-forming ink | Type of protective layer-forming ink | Heating step | | | Solvent-removing step | | | Rating |
|---|---|---|---|---|---|---|---|---|---|---|
| | | | | Heating rate (° C./s) | Heating temperature (° C.) | Heating time (s) | Air temperature (° C.) | Air velocity (m/s) | Air-blowing time (s) | |
| Example 1 | S1 | C1 | OP1 | 40 | 80 | 2 | 90 | 15 | 58 | A |
| Example 2 | S2 | C1 | OP1 | 40 | 80 | 2 | 90 | 15 | 58 | A |
| Example 3 | S3 | C1 | OP1 | 40 | 80 | 2 | 90 | 15 | 58 | B |
| Example 4 | S4 | C1 | OP1 | 40 | 80 | 2 | 90 | 15 | 58 | A |
| Example 5 | S5 | C2 | OP1 | 40 | 80 | 2 | 90 | 15 | 58 | A |
| Example 6 | S5 | C2 | OP2 | 40 | 80 | 2 | 90 | 15 | 58 | A |
| Comparative Example | S1 | C1 | OP1 | — | — | — | — | — | — | C |

(5) Evaluation of Adhesion of Image Layers

The adhesion of the image layers was evaluated by a cross-cut test in accordance with JIS K 5600. The rate of peeling a transparent pressure-sensitive adhesive tape was 0.6 m/min.

For evaluation, the area fraction (peeling ratio) of a peeled portion of each image layer was measured. The image layer was evaluated in accordance with standards below.

A: a peeling ratio of 15% or less.

B: a peeling ratio of more than 15% to 25% or less.

C: a peeling ratio of more than 25%.

Evaluation results are summarized in Table 4.

As is clear from Table 4, in the records obtained in Examples 1 to 6, the adhesion of the image layers is excellent and the image layers exhibit excellent fastness. In contrast, in the comparative example, no satisfactory results are obtained.

8. A record manufactured by the method according to claim 1.

9. A record manufactured by the method according to claim 2.

10. A record manufactured by the method according to claim 3.

11. A record manufactured by the method according to claim 4.

12. A record manufactured by the method according to claim 5.

13. A record manufactured by the method according to claim 6.

14. A record manufactured by the method according to claim 7.

15. The method according to claim 1, wherein heating the image layer further comprises heating the image layer while surrounding the image layer with a vapor of solvent.

16. The method according to claim 1, wherein a heating time is 2 seconds to 5 seconds after the temperature of heating the image layer is attained.

\* \* \* \* \*